Feb. 25, 1969     R. J. PIPER ET AL     3,429,185
OMNI-DIRECTIONAL VACUUM GAUGE PROBE
Filed July 18, 1967
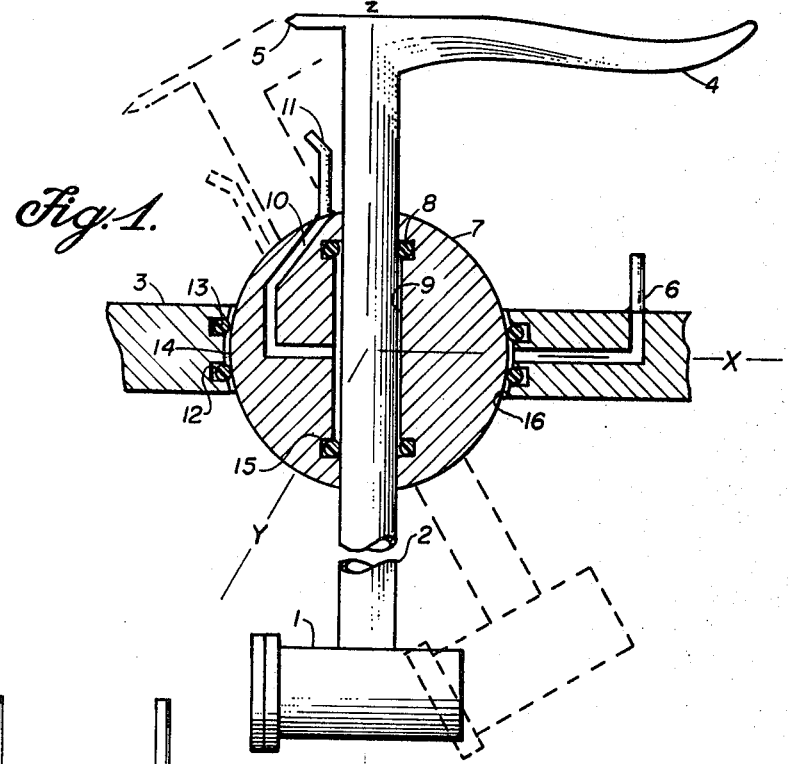
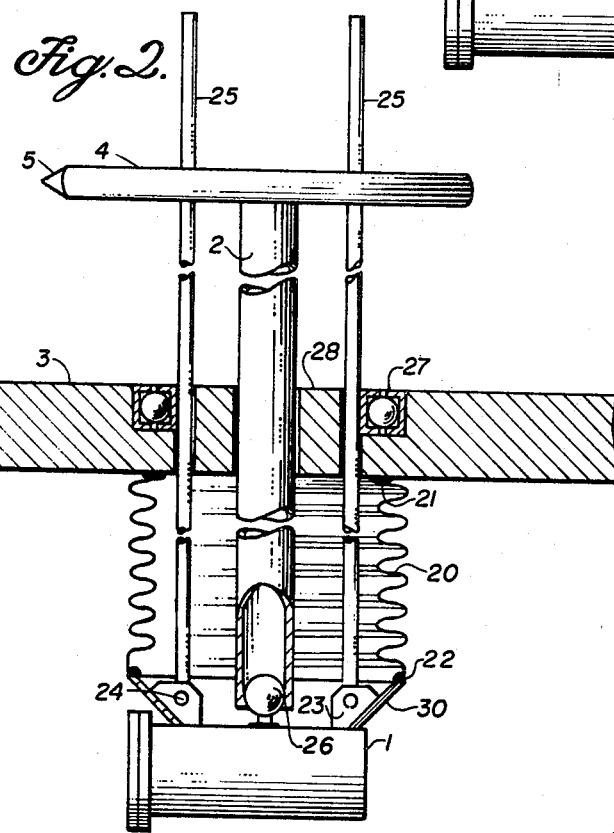
INVENTORS
ROBERT J. PIPER
JAMES A. CRAIG
RICHARD A. DUTTON
BY
ATTORNEY

United States Patent Office

3,429,185
Patented Feb. 25, 1969

3,429,185
OMNI-DIRECTIONAL VACUUM GAUGE PROBE
Robert J. Piper, Huntington Beach, and James A. Craig, El Toro, Calif., and Richard A. Dutton, Chesterfield, Mo., assignors, by mesne assignments, to the United States of America as represented by the United States Atomic Energy Commission
Filed July 18, 1967, Ser. No. 654,283
U.S. Cl. 73—420   1 Claim
Int. Cl. B60c 25/00

ABSTRACT OF THE DISCLOSURE

A vacuum gauge system is provided which is capable of movement in any direction within a container having a vacuum atmosphere for measuring the effective pressure or molecular flux in any direction therein. Several embodiments are shown which provide not only omni-directional movement of the gauge but also provide an improved vacuum seal system at the entrance to the vacuum system. One apparatus illustrative of the omni-directional gauge includes a ball joint seal at the entrance to the vacuum atmosphere thereby providing a pump out port for preventing external air from entering the vacuum system while also providing three-dimentional movement of the gauge. Another species of the invention shows the gauge attached to a bellows arrangement having push rods entering the vacuum atmosphere which are capable of swinging and compressing or extending the bellows and gauge arrangement.

Background of the invention

This invention relates to a vacuum gauge and more particularly to an improved gauge capable of omni-directional movement within a vacuum system. This invention arose in the course of or under Contract AT(11–1)–GEN–8, with the U.S. Atomic Energy Commission.

Measurement of vacuum within a vacuum system is well known in the art. It has been discovered, however, that at very high vacuum the pressure within a system is not the exact or actual pressure imposed upon any particular element within that vacuum system. This phenomenon or effect occurs particularly at very low pressures of the order of $10^{-9}$ torr or lower.

The vacuum pressure within any system is related to the interaction or collision of molecules within the system. However, at very low pressure the molecules have extraordinarily long meanfree paths; consequently the interaction between molecules of the atmosphere within the system is much less than the inter-action of the molecules with the walls of the container. As a result, under such low pressure conditions, the "effective" pressure within the container varies in particular directions or positions within such a system. Actually it is known that the effective pressure of the molecular flux existing at a particular location may exceed the average or characteristic pressure within such a system by as much as 1000 times the average pressure.

Summary of the invention

Accordingly, it is an object of this invention to measure the effective or molecular pressure within any system at any point theerin and in any direction. Another object is to provide apparatus for positioning a vacuum gauge in any position within a vacuum system in order to measure the molecular flux in any direction.

Another object to provide a vacuum gauge capable of three-dimensional movement within the vacuum system.

The invention provides two illustrative embodiments capable of movement to any position within the vacuum system. In one embodiment a bellows is attached to the vacuum gauge for positioning the gauge within the vacuum system and push rods are connected for compressing or extending and swinging the bellows and gauge within the system. In another embodiment the vacuum gauge is inserted within the vacuum system and is manipulated through a ball and socket swivel-joint having a vacuum pumpout means at the junction of the ball and socket.

Description of the drawings

FIGURE 1 shows one embodiment of the invention illustrating the ball and socket swivel-joint manipulator.

FIGURE 2 shows another embodiment of the invention illustrating the bellows manipulator.

Description of the invention

In FIGURE 1 a vacuum gauge 1 of any conventional type connected to a hollow shaft or cylinder 2; the gauge is inserted into the vacuum container through the flange 3. A three-dimension positioning handle 4 is shown with a position indicator or pointer at 5 for providing an external indication of the gauge position and orientation within the system. Rotation of the handle indicates position and orientation of the gauge in the x/y plane while movement up or down indicates position along the Z-axis.

The flange 3 is shown having an opening at 16; the inner surface of this opening has the surface of a sphere and forms a socket joint. The socket joint includes a pair of concentric grooves 12 for receiving annular O-rings 13. The inner side-wall of the grooves is reduced to form an annular air gap 14 which is evacuated by pump-out port 6 to thereby provide a vacuum seal between the ball and socket at the joint.

A spherical-shaped ball is shown at 7 and includes a cylindrical opening for receiving the movable cylinder 2. The surface of this opening includes two annular grooves 15 in which the inner sidewall has been reduced to provide an annular cavity 9 interconnecting the grooves; metal or rubber O-rings 8 are inserted in the grooves in sealing relationship with the movable cylinder. A channel 10 connects to a pump-out port 11 and cavity 9 so that the space between the O-rings 8 in the cavity is evacuated to provide a very effective seal between the atmosphere and the internal vacuum system.

As shown in FIGURE 1 the position handle indicator and gauge may be rotated clockwise or counterclockwise in the x–y plane as well as raised and lowered in the Z plane for complete three-dimensional movement as desired. A three-dimensional scale may be associated with the pointer. The sealing mechanism is extremely efficient and such efficiency is essential because of the low pressure atmospheres being measured.

The invention as shown in FIGURE 2 shows a vacuum gauge 1 and the flange 3 having the same numerals as in FIGURE 1. In addition, there is shown a bellows 20 connected in a sealed relationship at one end 21 such as by soldering to the flange 3 and at the opposite end 22 to the gauge. The bellows is attached to the gauge by the use of an adapter cone 30 which seals off the bellows while also providing a connection point between the bellows and the gauge and also between the mechanical movement mechanisms.

Within the adapter cone are two hanger-rods 23 and a ball pivot 26. The adapter cone is welded to end 22 of bellows 20 to provide a seal between the vacuum system and the external atmosphere existing inside the bellows. The hanger-rods are connected with a pin 24 to the tilt positioning push rods 25 which extend up through the bellows and flange 3 for external operation. Gauge 1 may be tilted vertically about ball 26 by manipulating rods 25 up and down. No seals are necessary where the push rods pass through the flange since the bottom end of the bellows is sealed at 22. A positioning wheel 4 and pointer indicator 5 are rigidly attached to hollow movable cylinder 2 and slidably fitted to push rods 25.

The movable cylinder 2 extends through the flange 3 and its lower end forms a socket joint for coacting with the ball pivot 26 at the closed end of the bellows 20 thereby adapting the bellows for linear movement up and down as well as twisting about the axis of cylinder 2.

Rotation of the vacuum gauge is provided by rotation of rods 25 and the ball-bearing joint 27 in the flange 3 thereby twisting the bellows. The annular member or disc 28 and the flange 3 form annular ball and socket joints in the form of an annular raceway for receiving ball bearings such that rotation of the annular member or disc 28 is provided within the flange whenever the push rods 25 are rotated.

It should be noted that the inner ports of the bellows provides a passage open to the external atmosphere so that all of the movable components within the system operate at the atmospheric pressure and the seal between the atmosphere and the vacuum system is provided by the bellows itself. Thus no sealing problem exists with this design.

Having described our invention in two embodiments, it will be clear that other equivalent steps or apparatus may be substituted therefore. Accordingly, the scope of our invention is defined in the following claims.

We claim:
1. Apparatus for measuring vacuum pressure within a system comprising:
   a vacuum gauge;
   a joint comprising a ball and socket mounted in a wall separating the vacuum system from the external atmosphere;
   said ball having a substantially cylindrical passage wherein is disposed a rotatable and slidable member connected at one end to the vacuum gauge and at the other end to a positioning handle;
   said passage having at least two interconnected annual grooves adapted for receiving annular O-rings in sealing relationship to said rotatable and slidable member;
   a passageway connected to said interconnected grooves for connection to evacuation apparatus;
   said socket having at least two interconnected annular grooves, O-rings within said grooves and a further passage for evacuating the space between these interconnected grooves;
   whereby the gauge may be raised and lowered, rotated within any plane parallel to which it has been raised or lowered and tilted for rotation in planes at an angle to the planes through which the gauge is raised or lowered.

References Cited
UNITED STATES PATENTS

| | | | |
|---|---|---|---|
| 1,642,577 | 9/1927 | Carson | 73—73 |
| 2,862,307 | 12/1958 | Bloomer | 34—92 |
| 3,028,183 | 4/1962 | Phillips | 277—100 |

LOUIS R. PRINCE, *Primary Examiner.*

D. E. CORR, *Assistant Examiner.*